United States Patent [19]

Mayo

[11] Patent Number: 4,721,644
[45] Date of Patent: Jan. 26, 1988

[54] BULLETIN BOARD

[75] Inventor: Steve I. Mayo, New York, N.Y.

[73] Assignee: Artistic Desk Pad & Novelty Co. Inc., Bronx, N.Y.

[21] Appl. No.: 909,642

[22] Filed: Sep. 19, 1986

[51] Int. Cl.⁴ .............................................. B32B 33/00
[52] U.S. Cl. ........................................ 428/91; 211/87; 428/71
[58] Field of Search ................. 211/87; D19/52, 53, D19/54; 428/71, 76, 91; 40/610

[56] References Cited

U.S. PATENT DOCUMENTS

| | | | |
|---|---|---|---|
| D. 246,180 | 10/1977 | Yamauchi | D19/52 |
| 2,826,240 | 3/1958 | Meier et al. | 428/71 X |
| 3,104,195 | 9/1963 | Warnbery | 428/71 |
| 3,640,796 | 2/1972 | Cotelle | 428/71 |
| 3,675,377 | 7/1972 | Suter | 428/71 X |
| 3,811,996 | 5/1974 | Polk | 428/71 |
| 3,906,127 | 9/1975 | Hollmann et al. | 428/71 X |
| 4,043,062 | 8/1977 | Lehrman | 428/71 X |
| 4,133,123 | 1/1979 | Anderson | D19/52 X |
| 4,637,151 | 1/1987 | Love et al. | 40/10 R |

Primary Examiner—Ramon S. Britts
Assistant Examiner—Sarah A. Lechok Eley
Attorney, Agent, or Firm—Sprung Horn Kramer & Woods

[57] ABSTRACT

A bendable and shipable bulletin board comprising front and rear layers heat sealed to one another, a foam core between the front and rear layers, and at least one stiffening layer between the front and rear layers. Advantageously the front layer is sueded so pin holes will not show and the foam and stiffening layers, possibly integral, can be folded over for shipping but, upon release, will resume their flat condition.

7 Claims, 3 Drawing Figures

BULLETIN BOARD

The present invention relates to a novel bulletin board onto which items may be pinned.

Conventional bulletin boards intended to receive pins are formed of cork with a backing to give stiffness and support and with a frame to prevent abrasion along the edge.

While these are quite satisfactory for certain purposes, in larger sizes they are difficult if not impossible to ship. For example, the major commercial shipper will not accept packages whose height plus girth exceed 104 inches. Thus, large boards cannot be mailed or shipped except with very special, costly handling.

Folding of such a board would make it meet shipping requirements but the cork would flake off and the backing and/or frame would have to be removed and then put back in position by the receiver.

It is accordingly an object of the invention to provide a new kind of bulletin board which can readily be shipped.

It is a further object of the invention to provide a bulletin board which can be folded over.

Still another object is to provide a bulletin board which does not require a frame.

These and other objects and advantages are realized in accordance with the present invention pursuant to which there is provided a bendable and shippable bulletin board comprising front and rear layers heat sealed to one another, a foam core between the front and rear layers, and at least one stiffening layer between the front and rear layers.

Advantageously two stiffening layers are provided, one between the core and front layer and the other between the core and rear layer.

In accordance with one aspect of the invention, transparent triangular pieces are heat sealed into each corner on the back along the edges, forming open pockets for holding push pins during shipping. They may also contain strips of male and female Velcro dots which may be used to attach the board to a wall.

The front and back layers are heat sealable plastic sheets, e.g. vinyl or the like. The front layer is preferably textured, i.e. sueded or scuffed, so that pin holes will not show.

The foam core can be a polyurethane or like foam which will permit penetration of a pin, possibly but not necessarily with a slight holding action. It may be a rigid foam or preferably somewhat resilient so it can be folded. Its thickness will correspond approximately to that of the push pins to be used therewith.

In accordance with another aspect of the invention the core may also be heat sealable so that it is peripherally joined to the front and back layers at the same time they are joined to on another.

The stiffening layers can be rubberized cardboard, relatively thick plastic sheets, thin but stiff foams, or the like. At least that layer between the front layer and foam must permit penetration by pins and grip such pins.

The stiffness serves to make the structure rigid and board-like. However, it should be sufficiently yieldable to permit bending for packing and shipping but subsequent recovery.

In accordance with one aspect of the invention, the foam core and the stiffening layer can be integral, i.e. the foam is itself stiff.

Possibly the stiffening layers are also heat sealable.

If desired, one or more of the layers may be adhered to one or both adjacent layers.

The board can be produced by pre-cutting the foam core and stiffening layers and placing them between oversized front and back layers, possibly with the transparent triangles. A heat sealing die then joins the front and back layers and envelops the other layers. If one or more of the other layers is also heat sealable it need not be precut to exact size but can be laid in slightly oversize so it will be included in the peripheral bonded lip which forms.

The invention will be further described with reference to the accompanying drawing wherein.

Figures 1, 3:
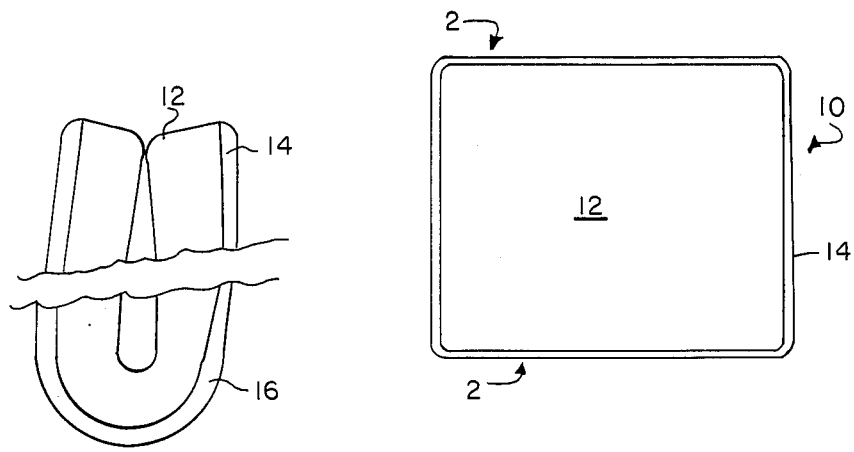
FIG. 1 is a plan view of a bulletin board in accordance with the invention.
FIG. 3 is a side view of the folded board suitable for shipping.

Referring now more particularly to the drawing, in FIG. 1 there is shown a board 10 comprising a heat sealable front layer 12 and a peripheral lip 14. Advantageously the front layer comprises a textured, scuffed or sueded layer which can be penetrated by a tack or push pin but will not leave a visible hole upon removal of the push pin.

Figure 2:
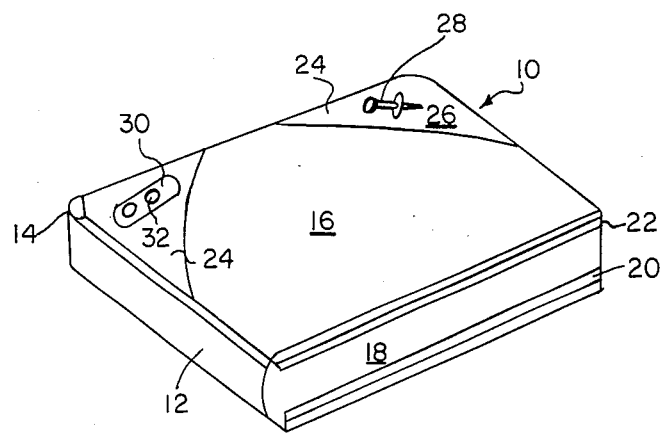
FIG. 2 is a perspective section along line 2—2 of FIG. 1.

FIG. 2 shows the board 10 primarily from its rear. The front layer 12 is heat sealed to the rear layer 16 along lip 14, forming a finished edge and in effect a closed pocket. In the middle of the closed pocket is a resilient foam core 18 and a pair of somewhat resilient stiffening layers 20 and 22. At least layer 20 is penetrable by a conventional bulletin board push pin and both layers 20 and 22 are resiliently bendable.

On the rear layer 16 at one corner there is heat sealed a transparent triangle or reinforcing member 24 which forms a pocket 26 open along its hypotenuse. Advantageously the triangle is slightly stretchable so that pocket 26 can serve as a container for one or more push pins 28 during shipping. The pin portion of push pin 28 is approximately equal in length to the thickness of the core.

Such pocket, or a similar pocket in another corner, can contain means for attaching the board to a wall such as a strip 30 of adhesively backed Velcro dots 32.

For purposes of shipping, the board 10 can be bent as shown in FIG. 3 so it will be thicker and narrower, rendering it more acceptable. The layers are of course bent but because of their resiliency will return to their original flat state when the bending force is removed.

The board can be made in several ways. In one, the stiffening layers 20, 22 and core 18 are cut to predetermined size and stacked on top of an oversized front layer 12. An oversized rear layer 16 is placed on top and, if desired, oversized triangles 24. A heat sealing die comes down and heat seals the front layer 12 to the rear layer 16 along lip 14, severing excess material. If present, triangles 24 are also heat sealed along lip 14.

Alternatively one or more of the stiffening layers 20, 22 and core 18, may also be heat sealable in which event they need not be pre-cut precisely but only roughly somewhat oversize so they will also be cut to size and heat sealed into and along the lip 14.

Push pins and/or fastening means are inserted into one or more pockets, the board is bent into a more compact package and is so secured by tape, cord or the wrapping. After reaching its destination the bending force is removed and the board permitted to re-assume its flat configuration. This might take a few minutes and will be assisted by a light weight on one of the faces or it will proceed even after hanging on a wall.

Push pins inserted through the face will penetrate but because of their length will generally not reach the rear stiffening layer. However, if they do, such rear stiffening layer will offer resistance. Upon withdrawal of the pin, the roughened surface of the front layer will not show a pin hole, if not immediately then shortly thereafter.

It will be understood that the specification and examples are illustrative but not limitative of the present invention and that other embodiments within the spirit and scope of the invention will suggest themselves to those skilled in the art.

What is claimed:

1. A bendable and shippable bulletin board comprising front and rear layers heat seals to one another, a foam core between the front and rear layer, and including two stiffening layers, one between the core and front layer and the other between the core and the rear layer wherein the front layer is sueded, and wherein means are provided for attaching the rear layer to a wall and wherein the board is for use with push pins having a pin at most approximately equal in length to the thickness of the core.

2. A board according to claim 1, wherein the front layer is textured.

3. A board according to claim 1, including at least one corner reinforcing member located at a corner on the rear layer and heat sealed to the rear layer.

4. A board according to claim 3, wherein the reinforcing member is transparent.

5. A board according to claim 3, wherein the board is rectangular and a reinforcing member is located at each corner.

6. A board according to claim 1, wherein the foam core is peripherally heat sealed to the front and/or back layers.

7. A board according to claim 1, including at least one corner reinforcing member located at a corner on the rear layer and heat sealed to the rear layer, such reinforcing member forming a pocket holding said pins.

* * * * *